Nov. 26, 1935.  P. BEYER  2,022,398

GREENHOUSE BENCH AND METHOD OF MAKING SAME

Original Filed Dec. 16, 1931

INVENTOR
PHILIPP BEYER

Patented Nov. 26, 1935

2,022,398

UNITED STATES PATENT OFFICE 2,022,398

GREENHOUSE BENCH AND METHOD OF MAKING SAME

Philipp Beyer, Brooklyn, N. Y.

Refiled for abandoned application Serial No. 581,315, December 16, 1931. This application May 8, 1935, Serial No. 20,444

5 Claims. (Cl. 47—18)

This invention relates to an improvement in the manufacture of greenhouse benches, and the method of making same.

It is the principal object of my invention to provide a greenhouse bench from a porous, moisture absorbing material providing the plants with the necessary amount of moisture.

It is well known that the greenhouse benches now in use, which are mostly made of wood or cement have disadvantages, as wood, while well adapted for the purpose is too expensive and quickly deteriorates.

Cement benches do not absorb water and are not well suited for plants.

It is, therefore, a further object of my invention to provide a greenhouse bench from burnt clay which is porous, and absorbs moisture which evaporates in the surrounding air and in this manner provides the moist air required for making the plants thrive.

It is a still further object of my invention to provide a porous moisture absorbing and permeating material made in plates of suitable forms and sizes allowing an enlargement of the work bench or decrease in its size according to necessity and requirement.

These and other objects and advantages of my invention will appear as the description thereof proceeds, and will then be more specifically defined in the appended claims.

In the accompanying drawing, I have shown a practical embodiment of my invention, and in said drawing.

Figure 1:
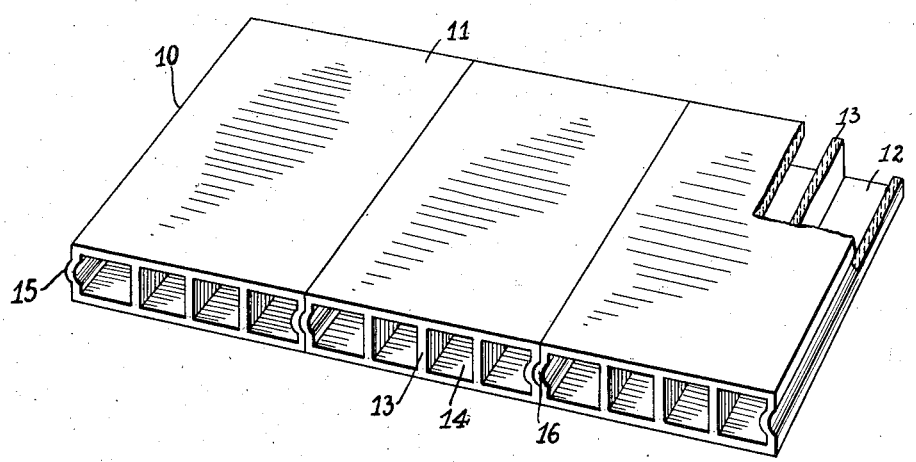
Fig. 1 is a perspective view of a plurality of sections of porous plates used in the construction of a greenhouse bench built according to this invention, a corner being broken away to disclose the interior construction.
Figure 2:
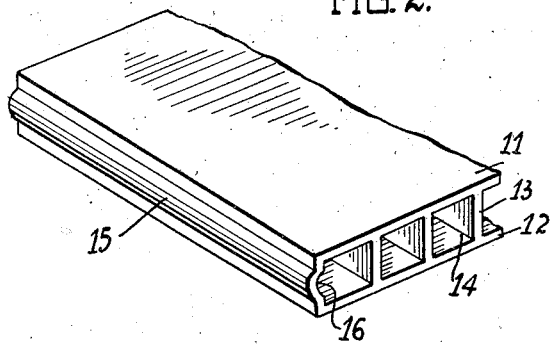
Fig. 2 is a fragmentary perspective end view of one section.

As shown, the greenhouse bench is made in sections, each comprising hollow tiles 10 of burnt clay the upper and lower plates 11 and 12 of which are connected by partition walls 13, forming hollow channels 14.

The outer end edges of each section are formed on one side with an outwardly bulging bead 15 adapted to snugly fit into a groove 16 formed in the end edge of the adjoining section.

In use, as many sections as necessary to the construction of a greenhouse bench of a desired size are placed endwise together as shown in Figure 1.

In practice, I mold from burnt clay hollow plates which can be telescoped or extended without requiring much time or labor, and which will last longer than wood which quickly deteriorates under the influence of the moisture to which the benches are constantly exposed. These porous plates will readily absorb any moisture and then give the same up as a nebulous mist to the atmosphere which makes the plants thrive and in contradistinction to the cold cement benches, the benches made of my porous material will provide a bench conducive to the growth and thriving of the plants.

It will be understood that I have described the preferred forms of my greenhouse bench and method of making the same as one example of the many possible ways to practically construct the same, and that I may make such changes therein as come within the scope of the appended claims without departure from the spirit of my invention.

Having thus described my invention, what I claim as new and desire to secure by Letters Patent is:

1. A greenhouse bench comprising a plurality of plates of a warm, porous material, and constructed to be assembled for making benches of suitable form and dimensions.

2. A greenhouse bench comprising a plurality of hollow tile composed of porous, moisture absorbing and dispensing material, said tile being open at their ends and tongue and groove elements on their respective sides and means for assembling said plates to form benches of varying area.

3. A greenhouse bench comprising a plurality of hollow plate made from burnt clay, and means for assembling said plates by telescoping to form benches of varying sizes or shapes.

4. A method of manufacturing greenhouse benches consisting in making hollow plates from a warm, porous material, and telescoping the adjoining plates to form a bench of desired size and form.

5. A method of manufacturing greenhouse benches, consisting in forming hollow plates from burnt clay, endwise telescoping said plates to unite the same for the formation of warm, moisture absorbing and dispensing greenhouse benches of desired dimensions and shape.

PHILIPP BEYER.